Figure 1:
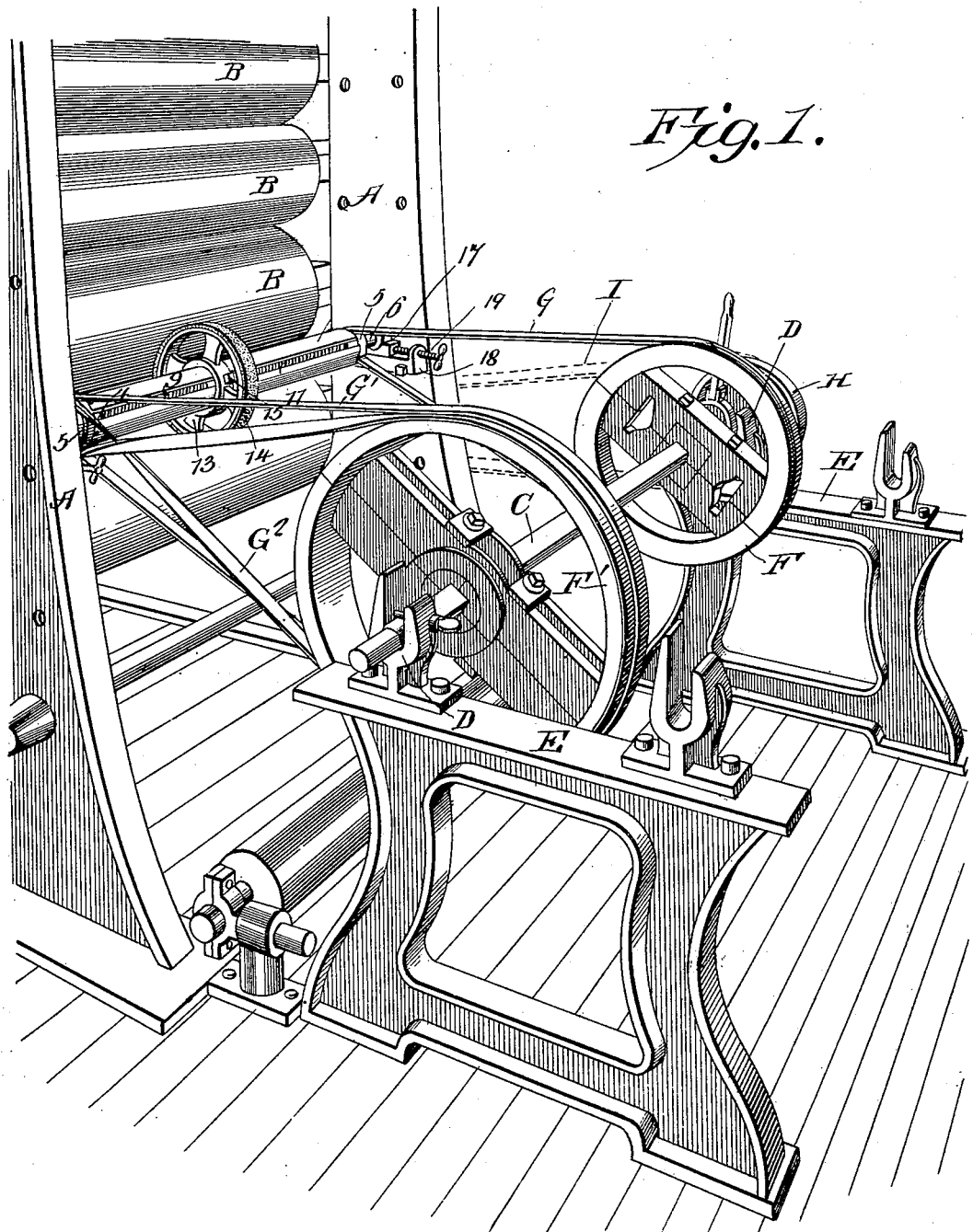

No. 678,961. Patented July 23, 1901.
J. LINTON.
MACHINE FOR GRINDING CALENDER ROLLS.
(Application filed Jan. 9, 1901.)
(No Model.) 2 Sheets—Sheet 1.

Witnesses
Howard D. Orr
J. W. Garner

Joseph Linton, Inventor.
by C. A. Snow & Co.
Attorneys

THE NORRIS PETERS CO., PHOTO-LITHO., WASHINGTON, D. C.

No. 678,961. Patented July 23, 1901.
J. LINTON.
MACHINE FOR GRINDING CALENDER ROLLS.
(Application filed Jan. 9, 1901.)
(No Model.) 2 Sheets—Sheet 2.
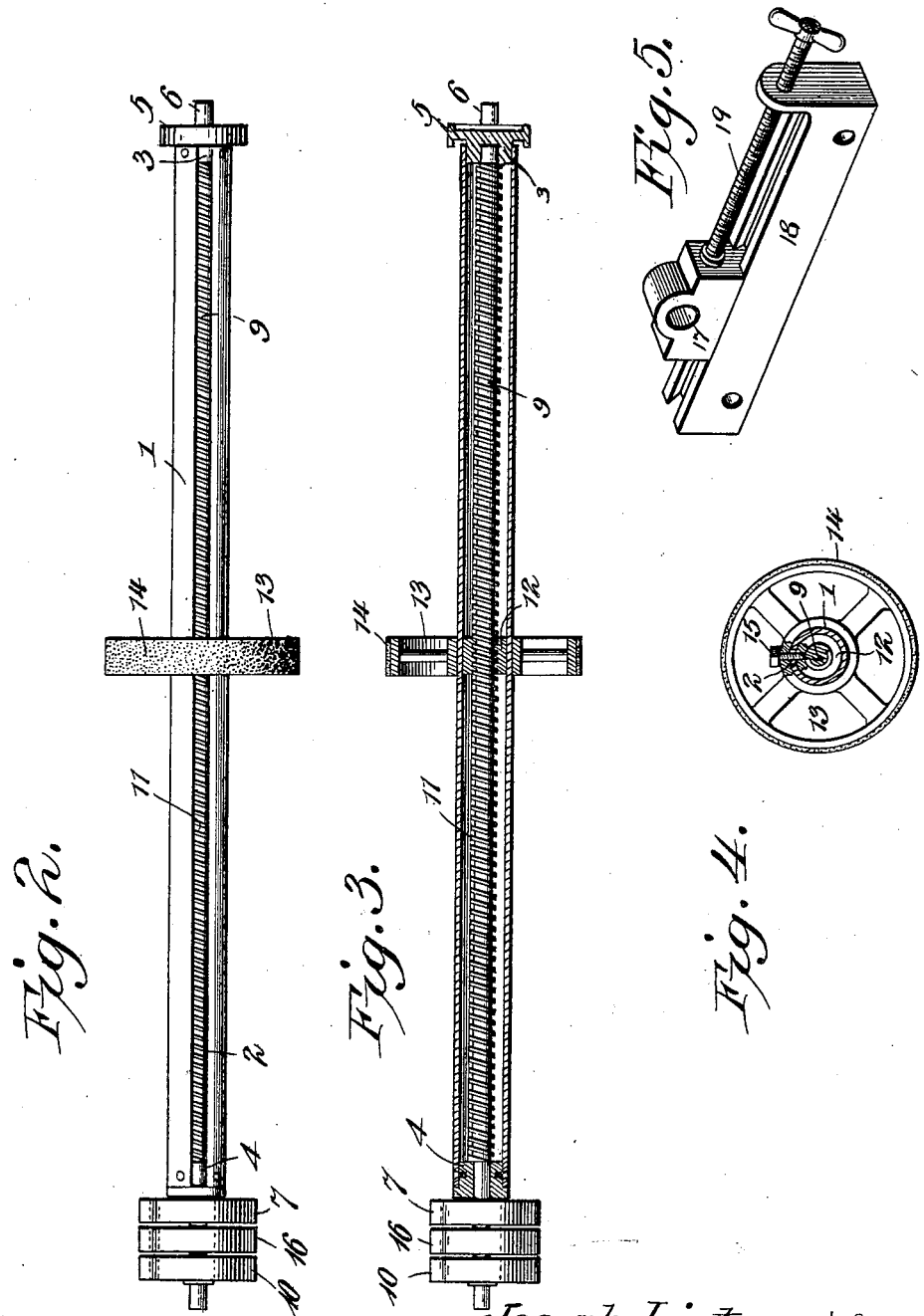

UNITED STATES PATENT OFFICE.

JOSEPH LINTON, OF MANCHESTER, VIRGINIA.

MACHINE FOR GRINDING CALENDER-ROLLS.

SPECIFICATION forming part of Letters Patent No. 678,961, dated July 23, 1901.

Application filed January 9, 1901. Serial No. 42,689. (No model.)

*To all whom it may concern:*

Be it known that I, JOSEPH LINTON, a citizen of the United States, residing at Manchester, in the county of Chesterfield and State of Virginia, have invented a new and useful Machine for Grinding Calender-Rolls, of which the following is a specification.

My invention is an improved machine for grinding calender-rolls for truing the same; and it consists in the peculiar construction and combination of devices hereinafter fully set forth and claimed.

In the accompanying drawings, Figure 1 is a perspective view of a calender-roll-grinding machine embodying my invention, showing the same in operative position on one of a set of calender-rolls. Fig. 2 is a detail elevation of the same. Fig. 3 is a longitudinal sectional view of the same. Fig. 4 is a transverse sectional view of the same. Fig. 5 is a detail perspective view of one of the bearings.

In the embodiment of my invention I provide a tubular shaft 1, of suitable length and diameter, which is slotted at one side throughout its entire length, as at 2. In the ends of said tubular shaft are secured heads 3 4, one of which is provided with a pulley 5 and a trunnion or spindle 6. A shaft 9 is disposed longitudinally in the center of tubular shaft 1, is journaled in bearings formed in the heads 3 4 of tubular-shaft 1, and is thereby adapted to rotate therein, and one end of said shaft 9 projects from one end of the tubular shaft 1 and carries a pair of fast pulleys 7 10 and a loose pulley 16, the latter being placed between the fast pulleys. That portion of the shaft 9 which is intermediate of the heads 3 4 is screw-threaded, as at 11, and on the said screw-shaft is a traveling nut 12. A grinding-wheel 13, which has a grinding-face 14 on its periphery, is loosely mounted on the tubular shaft 1 and adapted to move back and forth on said tubular shaft 1, and the said grinding-wheel is connected to the traveling nut 12 by a screw 15 or other suitable device which operates in the slot 2. Said slot adapts the grinding-wheel to be moved back and forth on the tubular shaft 1, as will be understood.

In the operation of my invention the grinding-machine is disposed parallel with the calender-roll to be ground and is supported and journaled in bearing-blocks 17, adapted to travel on cleats 18, which are bolted to the inner sides of the standards A of the frame in which the calender-rolls are mounted. Said bearing-blocks 17 are adjusted by screws 19 to cause the grinding-wheel to engage the face of the roll. It will be understood that by revolving the tubular shaft 1 and screw-shaft 9 at different rates of speed the grinding-wheel will be caused to rotate and to travel lengthwise on the said tubular shaft 1. The grinding-face of the said grinding-wheel being in engagement with the roll to be ground, it will be understood that the said grinding-wheel by its rotation and its longitudinal movement on the tubular shaft 1 will grind the said roll evenly and keep the same in true cylindrical form. Any suitable means may be employed for rotating the tubular shaft 1 and screw-shaft 9. To effect this, I have shown in Fig. 1 a counter-shaft C, which is mounted in bearings D on a frame E, is provided with pulleys F and F', and is provided at one end with a power-pulley H, driven by a power-belt I, of the usual form, which derives its power from the lower roll. An endless belt G connects the pulley F and the pulley 5 of the tubular shaft. An endless belt G' connects the pulley F', which is of greater diameter than the pulley F, with the pulley 7, carried by the screw-shaft 9, and hence rotates the latter at a higher rate of speed than the tubular shaft and causes the grinding-wheel to traverse the tubular shaft in one direction. A crossed belt $G^2$ is driven also by the pulley F' and engages the loose pulley 16, while the belt G' engages the pulley 7. When, however, it is necessary to reverse the rotation of the screw-shaft in order to reverse the movement of the grinding-wheel on the tubular shaft, the belt $G^2$ is shifted from the loose pulley 16 to the fast pulley 10, and the belt G' is simultaneously shifted from the fast pulley 7 to the loose pulley 16 by means of a belt-shifter of the usual form, which is well understood, and hence is not here shown.

My improved grinding-machine may be readily set up and disposed in operative position and enables the calender-rolls to be ground and trued without the necessity of removing the rolls from their bearings.

I do not desire to limit myself to the precise construction and combination of devices hereinbefore described, as it is evident that modifications may be made therein without departing from the spirit of my invention.

Having thus described my invention, I claim—

1. In a machine of the class described, the combination of a tubular shaft having a longitudinal slot, said tubular shaft being further provided at one end with a pulley 5, a shaft having a single screw-thread thereon, said shaft being disposed and having its bearings in said tubular shaft and provided at one end, which projects from the tubular shaft with fast pulleys 7, 10, and a loose pulley 16 between them, a traveling nut on said screw-shaft, and a grinding-wheel on and adapted to travel from end to end of the tubular shaft, said grinding-wheel being connected to said traveling nut, substantially as described.

2. In a machine of the class described, the combination of a tubular shaft having a longitudinal slot, a shaft having a single screw-thread and disposed and adapted for rotation in said tubular shaft, means to rotate said screw and tubular shafts at different rates of speed, and in the same or in reverse directions, a traveling nut on said screw-shaft, and a grinding-wheel on and adapted to travel from end to end of said tubular shaft, substantially as described.

In testimony that I claim the foregoing as my own I have hereto affixed my signature in the presence of two witnesses.

JOSEPH LINTON.

Witnesses:
S. S. P. PATTESON,
C. C. COUSINS.